(12) United States Patent
Kang

(10) Patent No.: US 11,543,986 B2
(45) Date of Patent: Jan. 3, 2023

(54) ELECTRONIC SYSTEM INCLUDING HOST, MEMORY CONTROLLER AND MEMORY DEVICE AND METHOD OF OPERATING THE SAME

(71) Applicant: SK hynix Inc., Icheon-si (KR)

(72) Inventor: Hye Mi Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/304,076

(22) Filed: Jun. 14, 2021

(65) Prior Publication Data

US 2022/0171532 A1    Jun. 2, 2022

(30) Foreign Application Priority Data

Dec. 2, 2020 (KR) .......................... 10-2020-0166882

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ....... G06F 3/064; G06F 3/0604; G06F 3/0679
See application file for complete search history.

(56) References Cited

U.S. PATENT DOCUMENTS

| | | | |
|---|---|---|---|
| 11,061,814 B1* | 7/2021 | O'Brien, III | ......... G06F 3/0616 |
| 2014/0177085 A1* | 6/2014 | Haga | ....................... G06F 12/08 |
| | | | 360/48 |
| 2016/0179386 A1* | 6/2016 | Zhang | ................... G06F 3/0679 |
| | | | 711/103 |
| 2022/0206689 A1* | 6/2022 | Huang | .................. G06F 3/0611 |

FOREIGN PATENT DOCUMENTS

| | | |
|---|---|---|
| KR | 10-1447188 | 10/2014 |
| KR | 10-2050732 | 12/2019 |

* cited by examiner

*Primary Examiner* — Francisco A Grullon
(74) *Attorney, Agent, or Firm* — Weaver Austin Villeneuve & Sampson LLP

(57) ABSTRACT

An electronic system includes a file system configured to assign logical block addresses corresponding to consecutive pieces of data sets of segments in a plurality of zones. The electronic system also includes a memory device including a plurality of memory blocks, and a memory controller configured to map the logical block addresses to physical block addresses corresponding to consecutive pages in the plurality of memory blocks to program the consecutive pieces of data to the consecutive pages in the plurality of memory blocks. The file system is configured to assign new logical block addresses corresponding to consecutive pieces of a data file to invalid segments in the plurality of zones.

20 Claims, 17 Drawing Sheets

FIG. 5

| FILE 1 | FILE 1 | FILE 1 | FILE 1 | FILE 1 | FILE 1 | FILE 1 |
|---|---|---|---|---|---|---|
| LBA 1 | LBA 2 | LBA 3 | LBA 4 | LBA 5 | LBA 6 | LBA 7 |

BLK1

| FILE 2 | FILE 2 | FILE 2 | FILE 2 | FILE 2 | FILE 2 | FILE 2 |
|---|---|---|---|---|---|---|
| LBA 8 | LBA 9 | LBA 10 | LBA 11 | LBA 12 | LBA 13 | LBA 14 |

BLK2

| FILE 3 | FILE 3 | FILE 3 | FILE 3 | FILE 3 | FILE 3 | FILE 3 |
|---|---|---|---|---|---|---|
| LBA 15 | LBA 16 | LBA 17 | LBA 18 | LBA 19 | LBA 20 | LBA 21 |

BLK3

---

| FILE 1 | FILE 1 | FILE 1 | FILE 1 | FILE 1 | FILE 1 | FILE 1 |
|---|---|---|---|---|---|---|
| LBA 1 | LBA 2 | LBA 3 | LBA 4 | LBA 5 | LBA 6 | LBA 7 |

ZONE1

| FILE 2 | FILE 2 | FILE 2 | FILE 2 | FILE 2 | FILE 2 | FILE 2 |
|---|---|---|---|---|---|---|
| LBA 8 | LBA 9 | LBA 10 | LBA 11 | LBA 12 | LBA 13 | LBA 14 |

ZONE2

| FILE 3 | FILE 3 | FILE 3 | FILE 3 | FILE 3 | FILE 3 | FILE 3 |
|---|---|---|---|---|---|---|
| LBA 15 | LBA 16 | LBA 17 | LBA 18 | LBA 19 | LBA 20 | LBA 21 |

ZONE3

| | | | | |
|---|---|---|---|---|
| FILE 1 / LBA 7 | FILE 2 / LBA 14 | FILE 3 / LBA 21 | FILE 4 / LBA 18 | |
| INV / LBA 6 | FILE 2 / LBA 13 | FILE 3 / LBA 20 | FILE 4 / LBA 17 | |
| FILE 1 / LBA 5 | FILE 2 / LBA 12 | FILE 3 / LBA 19 | FILE 4 / LBA 15 | |
| FILE 1 / LBA 4 | FILE 2 / LBA 11 | INV / LBA 18 | FILE 4 / LBA 10 | |
| INV / LBA 3 | INV / LBA 10 | INV / LBA 17 | FILE 4 / LBA 9 | |
| FILE 1 / LBA 2 | INV / LBA 9 | FILE 3 / LBA 16 | FILE 4 / LBA 6 | |
| FILE 1 / LBA 1 | FILE 2 / LBA 8 | INV / LBA 15 | FILE 4 / LBA 3 | |
| BLK1 | BLK2 | BLK3 | BLK4 (OP) | |

- - - - - - - - - - - - - - - - - - - - - - - - - - - - - - - - - - - - - -

| | | | |
|---|---|---|---|
| FILE 1 / LBA 7 | FILE 2 / LBA 14 | FILE 3 / LBA 21 | |
| FILE 4 / LBA 6 | FILE 2 / LBA 13 | FILE 3 / LBA 20 | |
| FILE 1 / LBA 5 | FILE 2 / LBA 12 | FILE 3 / LBA 19 | |
| FILE 1 / LBA 4 | FILE 2 / LBA 11 | FILE 4 / LBA 18 | |
| FILE 4 / LBA 3 | FILE 4 / LBA 10 | FILE 4 / LBA 17 | |
| FILE 1 / LBA 2 | FILE 4 / LBA 9 | FILE 3 / LBA 16 | |
| FILE 1 / LBA 1 | FILE 2 / LBA 8 | FILE 4 / LBA 15 | |
| ZONE1 | ZONE2 | ZONE3 | |

FIG. 10

ZONE1

| FILE 1 | FILE 1 | FILE 4 | FILE 1 | FILE 1 | FILE 4 | FILE 1 |
|---|---|---|---|---|---|---|
| LBA 1 | LBA 2 | LBA 3 | LBA 4 | LBA 5 | LBA 6 | LBA 7 |

ZONE2

| FILE 2 | FILE 4 | FILE 4 | FILE 2 | FILE 2 | FILE 2 | FILE 2 |
|---|---|---|---|---|---|---|
| LBA 8 | LBA 9 | LBA 10 | LBA 11 | LBA 12 | LBA 13 | LBA 14 |

ZONE3

| FILE 4 | FILE 3 | FILE 4 | FILE 4 | FILE 3 | FILE 3 | FILE 3 |
|---|---|---|---|---|---|---|
| LBA 15 | LBA 16 | LBA 17 | LBA 18 | LBA 19 | LBA 20 | LBA 21 |

⇒

ZONE_X

| FILE 1 | FILE 1 | FILE 1 | FILE 1 | FILE 1 | FILE 2 | FILE 2 |
|---|---|---|---|---|---|---|
| LBA X1 | LBA X2 | LBA X3 | LBA X4 | LBA X5 | LBA X6 | LBA X7 |

ZONE_Y

| FILE 2 | FILE 2 | FILE 2 | FILE 3 | FILE 3 | FILE 3 | FILE 3 |
|---|---|---|---|---|---|---|
| LBA Y1 | LBA Y2 | LBA Y3 | LBA Y4 | LBA Y5 | LBA Y6 | LBA Y7 |

ZONE_Z

| FILE 4 | FILE 4 | FILE 4 | FILE 4 | FILE 4 | FILE 4 | FILE 4 |
|---|---|---|---|---|---|---|
| LBA Z1 | LBA Z2 | LBA Z3 | LBA Z4 | LBA Z5 | LBA Z6 | LBA Z7 |

FIG. 11

ELECTRONIC SYSTEM INCLUDING HOST, MEMORY CONTROLLER AND MEMORY DEVICE AND METHOD OF OPERATING THE SAME

CROSS-REFERENCE TO RELATED APPLICATION

The present application claims priority under 35 U.S.C. § 119(a) to Korean Patent Application Number 10-2020-0166882, filed on Dec. 2, 2020, which is herein incorporated by reference in its entirety for all purposes.

BACKGROUND

1. Technical Field

Various embodiments described in the present disclosure generally relate to an electronic device, and more particularly, to an electronic system and a method of operating the electronic system.

2. Related Art

A storage device is a device that stores data under the control of a host device, such as a computer, a smartphone, or a smartpad. Examples of the storage device include a device such as a hard disk drive (HDD) which may store data in a magnetic disk, and a device such as a solid state drive (SSD) or a memory card which may store data in a semiconductor memory, particularly, a nonvolatile memory, according to the device in which the data is stored.

The storage device may include a memory device in which data is stored and a memory controller which controls the storage of data in the memory device. Such memory devices may be classified into volatile memory and nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments described in the present disclosure are directed to an electronic system that translates randomly written logical block addresses into addresses corresponding to consecutive data, and a method of operating the electronic system.

According to certain embodiments, an electronic system may include a file system is configured to assign logical block addresses corresponding to consecutive pieces of data to sets of segments in a plurality of zones. The electronic system may also include a memory device including a plurality of memory blocks, and a memory controller configured to map the logical block addresses to physical block addresses corresponding to consecutive pages in the plurality of memory blocks to program the consecutive pieces of data to the consecutive pages in the plurality of memory blocks. The file system may be configured to assign new logical block addresses corresponding to consecutive pieces of a data file to invalid segments in the plurality of zones. Each of the invalid segments may have been assigned a logical block address that is mapped to a physical block address associated with invalid data.

According to certain embodiments, it provides a method of operating an electronic system that includes a file system, and a memory device including a plurality of memory blocks. The method may include assigning logical block addresses corresponding to consecutive pieces of data to sets of segments in a plurality of zones; generating mapping relationships between the logical block addresses and physical block addresses corresponding to consecutive pages in the plurality of memory blocks; programming, based on the mapping relationships, the consecutive pieces of data to the consecutive pages in the plurality of memory blocks; updating the mapping relationships, the updated mapping relationships indicating one or more physical block addresses associated with invalid data; and assigning new logical block addresses corresponding to consecutive pieces of a data file to invalid segments, where each of the invalid segments has been assigned a logical block address mapped to a physical block address of the one or more physical block addresses associated with invalid data.

BRIEF DESCRIPTION OF THE DRAWINGS

FIG. 5 is a diagram illustrating zones of an example of a file system and programmed memory blocks.

FIG. 7 is a diagram illustrating an example of updating respective zones of a file system depending on map update.

FIG. 8 is a diagram illustrating an example in which logical block addresses are overwritten to invalidated segments.

FIG. 9 is a diagram illustrating an example of programming data after logical block addresses are overwritten.

FIG. 10 is a diagram illustrating an example of a process in which garbage collection is performed in a file system.

FIG. 11 is a diagram illustrating mapping relationships that are changed after garbage collection has been performed on a file system.

DETAILED DESCRIPTION

Specific structural or functional descriptions of the embodiments introduced in this disclosure are only for description of the illustrative embodiments. The descriptions should not be construed as limiting the scope of this disclosure to the illustrative embodiments described in this disclosure.

Various embodiments will now be described more fully hereinafter with reference to the accompanying drawings, in which illustrative embodiments are depicted, so as to provide those of ordinary skill in the art with an enabling description for implementing various embodiments.

Figure 1:
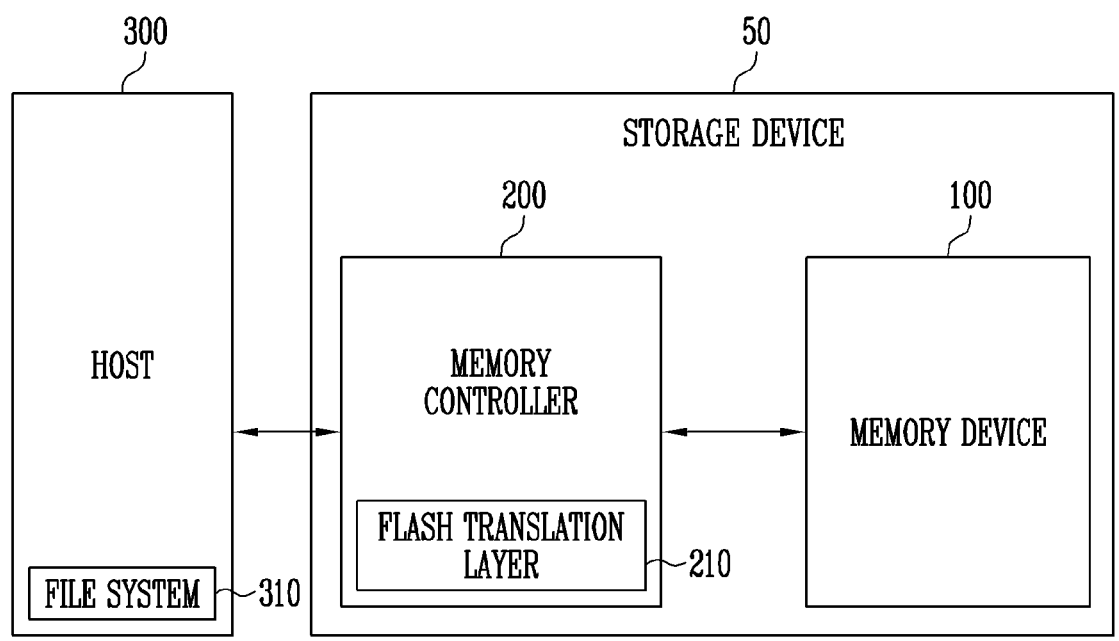
FIG. 1 is a block diagram of an example of a storage device.

FIG. 1 is a block diagram of an example of a storage device.

In the example illustrated in FIG. 1, a storage device 50 may include one or more memory devices 100 and a memory controller 200.

The storage device 50 may be a device that stores data under the control of a host 300, such as a mobile phone, a smartphone, an MP3 player, a laptop computer, a desktop computer, a game console, a television (TV), a tablet PC, or an in-vehicle infotainment system.

The storage device 50 may include any one of various types of storage devices, depending on a host interface that is a scheme for communication with the host 300. For example, the storage device 50 may be implemented as any one of various types of storage devices, such as a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, a memory stick, and the like.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), wafer-level stack package (WSP), and the like.

The memory device 100 may store data. The memory device 100 may operate in response to the control of the memory controller 200. The memory device 100 may include a memory cell array including a plurality of memory cells that can store data. The memory cell array may include a plurality of memory blocks. Each memory block may include a plurality of memory cells, which may constitute a plurality of pages. In an embodiment, a page may be a unit by which data is stored in the memory device 100 or by which data stored in the memory device 100 is read. A memory block may be a unit by which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description will be made for the embodiment where the memory device 100 is a NAND flash memory.

The memory device 100 may be implemented in a two-dimensional (2D) array structure or a three-dimensional (3D) array structure. Hereinafter, although a 3D array structure is described as an example, the present disclosure is not limited to the 3D array structure. The present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, the memory device 100 may operate in a single-level cell (SLC) manner in which one data bit is stored in one memory cell. Alternatively, the memory device 100 may operate in a manner in which at least two data bits are stored in one memory cell. For example, the memory device 100 may operate in a multi-level cell (MLC) manner in which two data bits are stored in one memory cell, a triple-level cell (TLC) manner in which three data bits are stored in one memory cell, a quadruple-level cell (QLC) manner in which four data bits are stored in one memory cell, or the like.

The memory device 100 may receive a command and an address from the memory controller 200, and may access an area of the memory cell array selected by the address. That is, the memory device 100 may perform an operation corresponding to the command on the area selected by the address. For example, the memory device 100 may perform a write operation (i.e., program operation), a read operation, or an erase operation in response to the received command. When a program command is received, the memory device 100 may program data to the area selected based on the address. When a read command is received, the memory device 100 may read data from the area selected based on the address. When an erase command is received, the memory device 100 may erase data stored in the area selected based on the address.

The memory controller 200 may control the overall operation of the storage device 50.

When a supply voltage is applied to the storage device 50, the memory controller 200 may run firmware. When the memory device 100 is a flash memory device, the memory controller 200 may run firmware, such as a Flash Translation Layer (FTL), for controlling communication between the host 300 and the memory device 100.

In an embodiment, the memory controller 200 may include firmware (not illustrated) that may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store a logical-physical address mapping table, which indicates mapping relationships between logical block addresses (LBA) and physical block addresses (PBA), in a buffer memory.

The memory controller 200 may control the memory device 100 so that a program operation, a read operation, or an erase operation can be performed in response to a request received from the host 300. For example, when a program request is received from the host 300, the memory controller 200 may convert the program request into a program command, and may provide the program command, a physical block address (PBA), and data to the memory device 100. When a read request together with a logical block address is received from the host 300, the memory controller 200 may convert the read request into a read command, select a physical block address corresponding to the logical block address, and thereafter provide the read command and the physical block address (PBA) to the memory device 100. When an erase request together with a logical block address is received from the host 300, the memory controller 200 may convert the erase request into an erase command, select a physical block address corresponding to the logical block address, and thereafter provide the erase command and the physical block address (PBA) to the memory device 100.

In an embodiment, the memory controller 200 may autonomously generate a program command, an address, and data without receiving a request from the host 300, and may transmit them to the memory device 100. For example, the memory controller 200 may provide commands, addresses, and data to the memory device 100 so as to perform background operations, such as a program operation for wear leveling to equalize memory space usage, and a program operation for garbage collection that clears outdated data from memory.

In an embodiment, the memory controller 200 may include a flash translation layer 210. The flash translation layer 210 may translate a logical block address (LBA) corresponding to a request received from the host 300 into a physical block address (PBA), and may output the physical block address (PBA) to the memory device 100.

For example, as described above, the flash translation layer 210 may translate a logical block address (LBA) corresponding to a program request into a physical block address (PBA), translate a logical block address (LBA) corresponding to a read request into a physical block address (PBA), or translate a logical block address (LBA) corresponding to an erase request into a physical block address (PBA). The flash translation layer 210 may output the translated physical block address (PBA) to the memory device 100, and the memory device 100 may perform an operation on a page or a memory block corresponding to the physical block address (PBA).

In an embodiment, the memory controller 200 may receive consecutive logical block addresses from a file system 310, and may translate the received logical block addresses into consecutive physical block addresses. When the consecutive physical block addresses are output to the memory device 100, the memory device 100 may perform consecutive operations corresponding to the consecutive physical block addresses.

In an embodiment, the storage device 50 may include a buffer memory (not illustrated). The memory controller 200 may control data exchange between the host 300 and the buffer memory (not illustrated). Alternatively, the memory controller 200 may temporarily store system data for controlling the memory device 100 in the buffer memory. For example, the memory controller 200 may temporarily store data from the host 300 in the buffer memory, and may then transmit the data temporarily stored in the buffer memory to the memory device 100.

In various embodiments, the buffer memory may be used as a working memory or a cache memory for the memory controller 200. For example, the buffer memory may store codes or commands to be executed by the memory controller 200. Alternatively, the buffer memory may store data to be processed by the memory controller 200.

In an embodiment, the buffer memory may be implemented as a DRAM, such as a double data rate SDRAM (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or may be implemented as a static RAM (SRAM).

In various embodiments, the buffer memory may be outside the storage device 50 and may be coupled to the storage device 50. In this case, volatile memory devices coupled to the storage device 50 may function as the buffer memory.

In an embodiment, the memory controller 200 may control at least two memory devices. In this case, the memory controller 200 may control the memory devices according to an interleaving scheme to improve operating performance.

The host 300 may communicate with the storage device 50 using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

In an embodiment, the host 300 may include the file system 310. The file system 310 may include a plurality of zones for improving the consecutive write performance of the storage device 50. The plurality of zones may be implemented using nonvolatile memory devices or volatile memory devices.

Further, each of the plurality of zones may include segments. For example, among the segments, a segment to which a logical block address is assigned may be a valid segment, and a segment to which a logical block address is not assigned may be a free segment. Further, as the mapping relationships are updated, a valid segment may be invalidated, and thus may become an invalid segment (also referred to as invalidated segment).

When a logical block address cannot be assigned any further to free segments among segments included in a plurality of zones, garbage collection (GC) may be performed, or alternatively, data may be overwritten to invalid segments, thus enabling the invalid segments to be reused.

Consecutive logical block addresses may be assigned to the plurality of zones. For example, logical block addresses corresponding to consecutive write requests may be sequentially assigned to free segments among the segments included in the plurality of zones. That is, in an embodiment, when a bad block, a failed page, or an invalid page is not included in the memory device 100, the performance of the storage device 50 controlled by the file system 310 may be improved.

However, when a bad block, a failed page, or an invalid page is included in the memory device 100, random writing rather than consecutive (continuous) writing may be performed. For example, a large amount of overwriting may occur in a plurality of zones of the file system 310, and random writing may be performed on the memory device 100. When random writing is performed, the performance of the storage device 50 may be deteriorated.

The present disclosure proposes a method of improving the performance of the storage device 50 when random writing may be performed due to the absence of a free segment in the file system 310.

Figure 2:
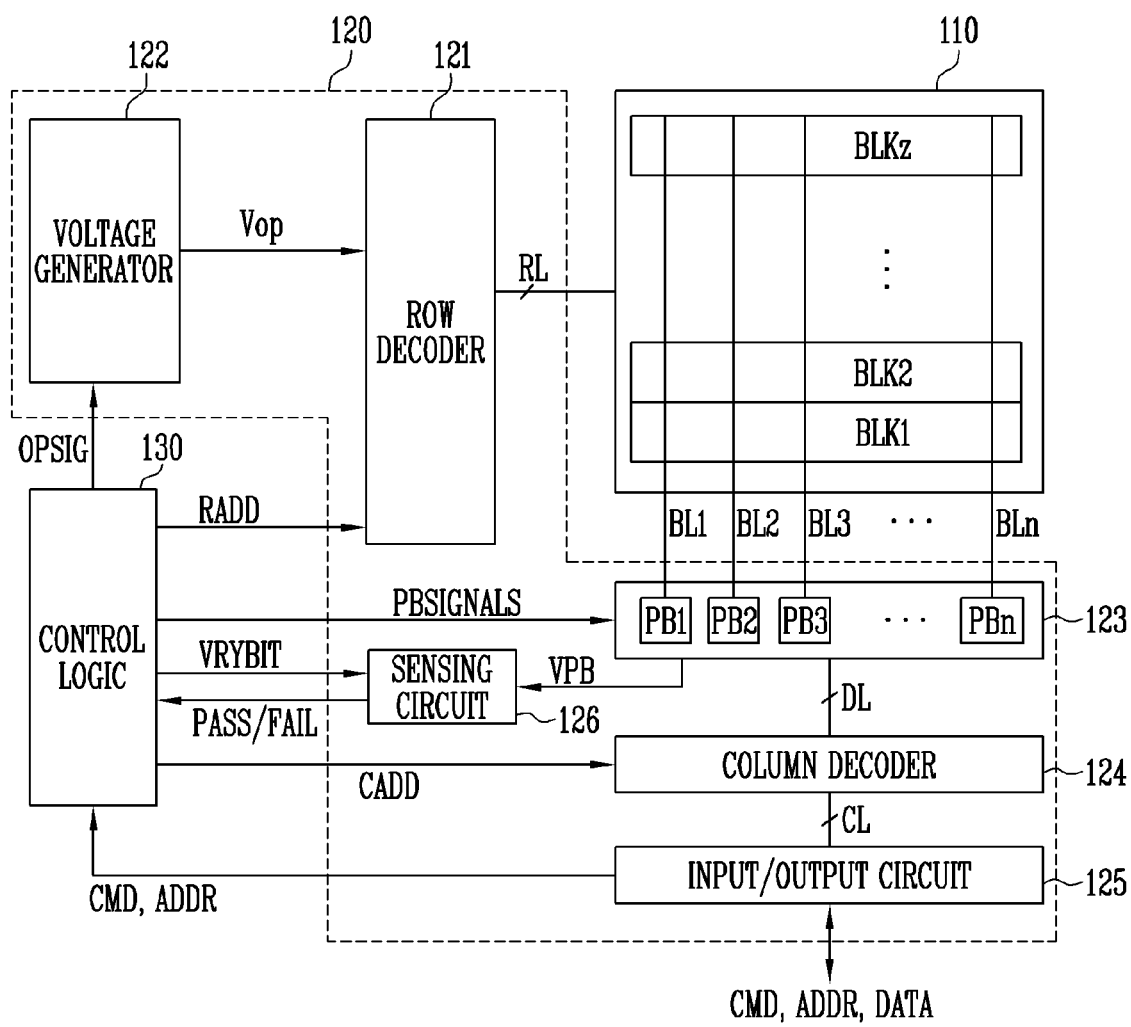
FIG. 2 is a block diagram illustrating the structure of an example of a memory device of the storage device of FIG. 1.

FIG. 2 is a block diagram illustrating the structure of an example of a memory device of the storage device of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. The row lines RL may include at least one source select line, a plurality of word lines, and at least one drain select line.

Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, a quadruple-level cell (QLC) capable of storing four data bits, and the like.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 selects at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using, for example, an external supply voltage provided to the memory device 100. More specifically, the voltage generator 122 may generate various operating voltages Vop that are used for program, read, and erase operations in response to an operation signal OPSIG. For example, the voltage generator 122 may generate a program voltage, a verify voltage, a pass voltages, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and may generate a plurality of voltages by selectively enabling the plurality of pumping capacitors under the control of the control logic 130.

The generated voltages may be supplied to the memory cell array 110 by the row decoder 121.

The page buffer group 123 includes first to nth page buffers PB1 to PBn. The first to nth page buffers PB1 to PBn are coupled to the memory cell array 110 through the first to nth bit lines BL1 to BLn. The first to nth page buffers PB1 to PBn are operated under the control of the control logic 130. More specifically, the first to nth page buffers PB1 to PBn may be operated in response to page buffer control signals PBSIGNALS. For example, the first to nth page buffers PB1 to PBn may temporarily store data received through the first to nth bit lines BL1 to BLn or may sense voltages or currents of the bit lines BL1 to BLn during a read or verify operation.

During a program operation, when the program voltage is applied to the selected word line, the first to nth page buffers PB1 to PBn may transfer the data, received through the input/output circuit 125, to selected memory cells through the first to nth bit lines BL1 to BLn. The memory cells in the selected page are programmed based on the received data DATA. During a program verify operation, the first to nth page buffers PB1 to PBn may read page data by sensing the voltages or currents received through the first to nth bit lines BL1 to BLn from the selected memory cells.

During a read operation, the first to nth page buffers PB1 to PBn may read data DATA from the memory cells in the selected page through the first to nth bit lines BL1 to BLn, and may output the read data DATA to the input/output circuit 125 under the control of the column decoder 124.

During the erase operation, the first to nth page buffers PB1 to PBn may allow the first to nth bit lines BL1 to BLn to float or may apply the erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR, received from the memory controller (e.g., memory controller 200 of FIG. 1) described above with reference to FIG. 1, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIG-NALS, and the enable bit VRYBIT in response to the command CMD and the address ADDR. For example, the control logic 130 may control a read operation on a selected memory block in response to a sub-block read command and an address. Also, the control logic 130 may control an erase operation on a selected sub-block included in a selected memory block in response to a sub-block erase command and an address. In addition, the control logic 130 may determine whether a verify operation has passed or failed in response to the pass or fail signal PASS or FAIL.

Figure 3:
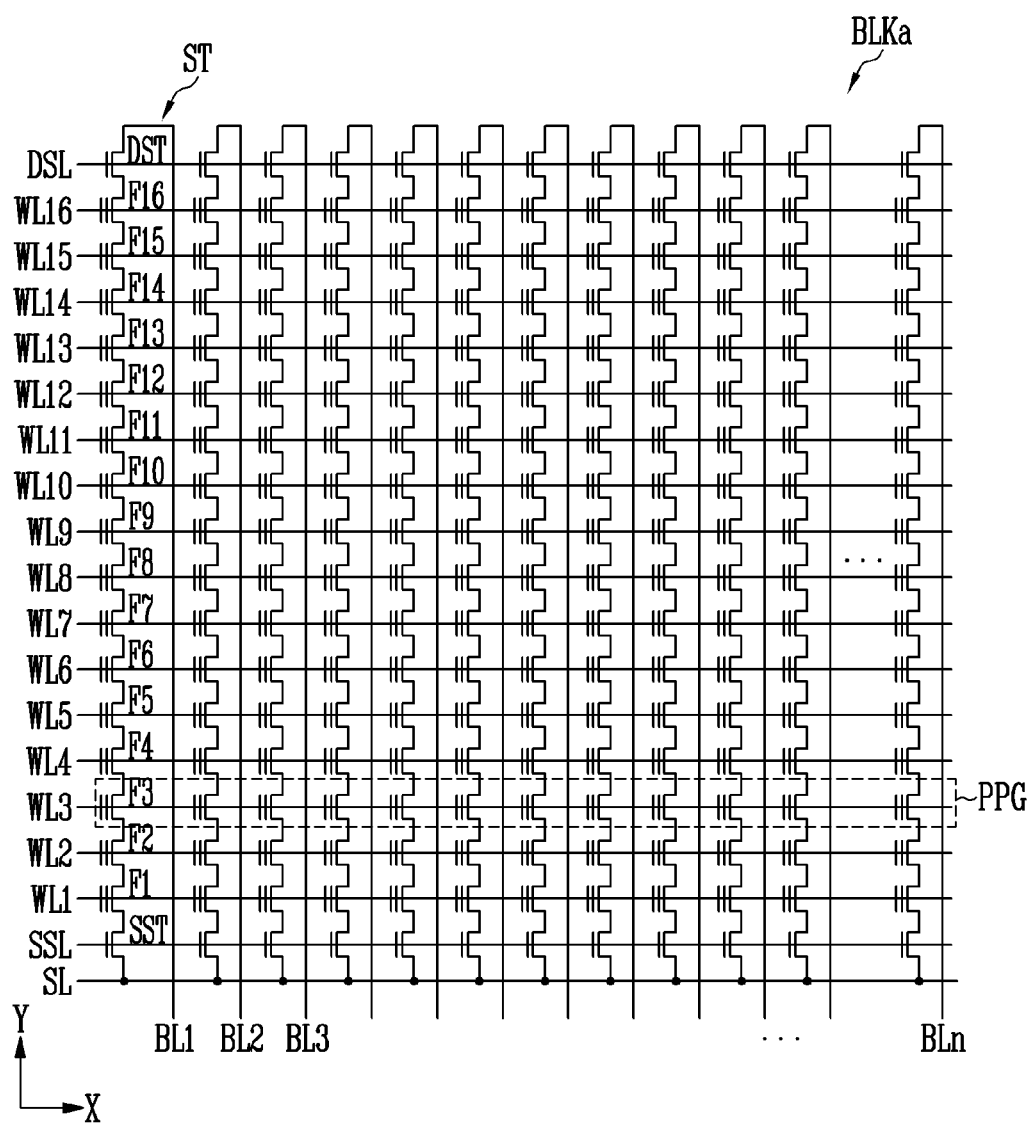
FIG. 3 is a diagram illustrating an example of a memory cell array of the memory device of FIG. 2.

FIG. 3 is a diagram illustrating an example of a memory cell array of the memory device of FIG. 2.

Referring to FIGS. 2 and 3, FIG. 3 is a circuit diagram illustrating any one memory block BLKa of a plurality of memory blocks BLK1 to BLKz included in the memory cell array 110 of FIG. 2.

The memory block BLKa may be coupled to a first select line, word lines, and a second select line that are coupled in parallel to each other. For example, the word lines may be coupled in parallel to each other between the first and second select lines. Here, the first select line may be a source select line SSL, and the second select line may be a drain select line DSL.

In the illustrated example, the memory block BLKa may include a plurality of strings coupled between bit lines BL1 to BLn and a source line SL. The bit lines BL1 to BLn may be coupled to the strings, respectively, and the source line SL may be coupled in common to the strings. Since the strings may be similarly configured, a string ST coupled to the first bit line BL1 will be described in detail by way of example.

The string ST may include a source select transistor SST, a plurality of memory cells F1 to F16, and a drain select transistor DST, which are coupled in series to each other between the source line SL and the first bit line BL1. A single string ST may include at least one source select transistor SST and at least one drain select transistor DST, and fewer or more memory cells than the memory cells F1 to F16 illustrated in FIG. 3 may be included in the string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST included in different strings ST may be coupled to the drain select line DSL, and gates of the memory cells F1 to F16 may be coupled to a plurality of word lines WL1 to WL16, respectively. A group of memory cells coupled to the same word line, among the memory cells included in different strings ST, may be referred to as a "physical page" ("PPG"). Therefore, the memory block BLKa may include a number of physical pages PPG identical to the number of word lines WL1 to WL16.

One memory cell may store one bit of data. This cell is typically designated as a "single-level cell" ("SLC"). Here, one physical page PPG may store data corresponding to one logical page LPG. The data corresponding to one logical page LPG may include a number of data bits identical to the number of memory cells included in one physical page PPG. Alternatively, one memory cell may store two or more bits of data. This cell is typically designated as a "multi-level cell" ("MLC"). Here, one physical page PPG may store data corresponding to two or more logical pages LPG.

A memory cell in which two or more bits of data are stored is called a multi-level cell (MLC). However, recently, as the number of data bits stored in one memory cell has increased, the multi-level cell (MLC) sometimes refers to a memory cell in which two bits of data are stored, and a memory cell in which three bits of data are stored is called a triple-level cell (TLC) and a memory cell in which four bits of data are stored is called a quadruple-level cell (QLC), and so on. In addition, a memory cell scheme in which multiple bits of data are stored has been developed, and the present embodiment may be applied to the memory device 100 in which two or more bits of data are stored in one memory cell.

In an embodiment, each of the memory blocks may have a three-dimensional (3D) structure. Each of the memory blocks may include a plurality of memory cells stacked vertically on a substrate. The plurality of memory cells are arranged in +X, +Y, and +Z directions.

Figure 4:
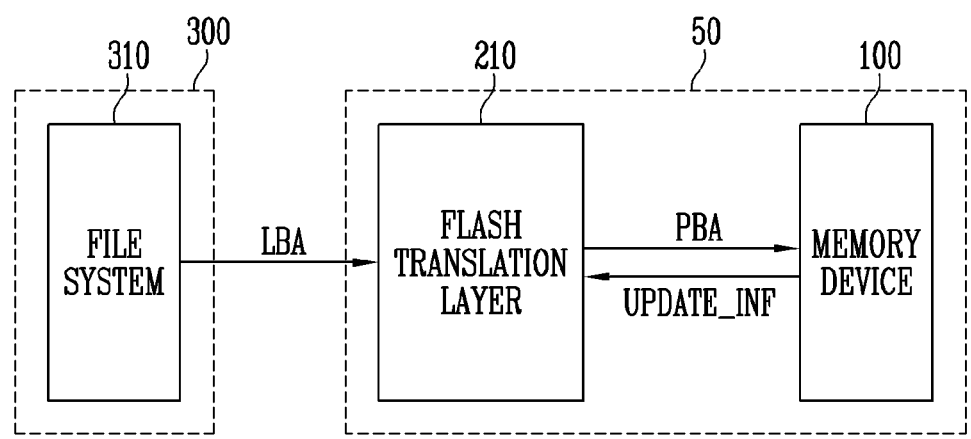
FIG. 4 is a simplified diagram illustrating an example of outputting and updating map data between a host and a storage device.

FIG. 4 is a simplified diagram illustrating an example of outputting and updating map data between a host and a storage device.

Referring to FIG. 4, the host 300 of FIG. 4 may include a file system 310, and the storage device 50 of FIG. 4 may include a flash translation layer 210 and a memory device 100.

The memory device 100 may not physically perform overwriting. Rather, during a program operation, the memory device 100 may perform an erase operation on the plurality of memory cells and thereafter program the plurality of memory cells (i.e., write after erase).

Therefore, due to the memory device 100 being unable to perform overwriting, the memory controller (e.g., memory controller 200 of FIG. 1) for controlling the memory device 100 may include the flash translation layer 210 which maps logical block addresses (LBA) to physical block addresses (PBA) so that consecutive write operations are physically performed on the memory device 100.

Thus, the flash translation layer 210 may allow the memory device 100 to perform consecutive write operations by mapping a physical block address (PBA) corresponding to a logical block address (LBA) to a new physical block address other than an invalidated address.

In an embodiment, the flash translation layer 210 may form a mapping relationship between the logical block address (LBA) and the physical block address (PBA), and may output the physical block address (PBA) to the memory device 100.

Thereafter, when map data is updated through wear-leveling or garbage collection (GC), the flash translation layer 210 may update a mapping relationship between the logical block address (LBA) and the physical block address (PBA) based on update information UPDATE_INF output from the memory device 100. That is, the flash translation layer 210 may form a new mapping relationship between the logical block address (LBA) and the physical block address (PBA).

In an embodiment, the file system 310 may improve the performance of the memory device 100. More specifically, the file system 310 may perform an operation of improving the performance of the memory device 100 during consecutive write operations of the memory device 100.

For example, when the host 300 outputs consecutive program requests to the storage device 50, the file system 310 may sequentially assign logical block addresses (LBA) corresponding to the consecutive program requests. In detail, the file system 310 may sequentially assign consecutive logical block addresses (LBA) to the plurality of zones, and may output the consecutive logical block addresses to the storage device 50.

In an embodiment, the file system 310 may autonomously update the logical block addresses (LBA) by sequentially assigning the consecutive logical block addresses (LBA) to the plurality of zones. Also, the file system 310 may autonomously perform garbage collection (GC) in the same manner as the memory device 100. That is, when a logical block address (LBA) of a specific segment, among segments included in a specific zone, is invalidated, garbage collection (GC) may be performed to secure free segments. Such garbage collection (GC) for the file system 310 may be performed during an idle time.

When the file system 310 is in a busy state, garbage collection (GC) may not be performed, and thus the file system 310 may assign a new logical block address (LBA) to a segment corresponding to an invalidated logical block address (LBA). This is referred to as a "slack space recycling (SSR)".

That is, in foreground garbage collection (foreground GC), rather than background garbage collection (background GC), a new logical block address (LBA) may be assigned to the invalidated segment. Here, the term "foreground garbage collection (foreground GC)" is an operation distinguished from background garbage collection (background GC), and denotes an operation performed after the file system 310 has completed an operation currently being performed. Foreground GC may be performed when background GC cannot be performed.

Therefore, after the file system 310 has completed assignment of logical block addresses to segments, a new logical block address may be assigned to an invalidated segment through foreground garbage collection (foreground GC). That is, foreground garbage collection (foreground GC) may be an operation that influences latency, and background garbage collection (background GC) may be an operation that does not influence latency because it is performed at an idle time during the operation of the file system 310.

In an example, when a new logical block address (LBA) is assigned to an invalidated segment, the memory device 100 may perform a random write operation rather than consecutive write operations. That is, since new logical block addresses (LBA) are randomly assigned to a plurality of zones of the file system 310, the memory device 100 may perform a random write operation.

According to certain embodiments, the present disclosure provides a method of assigning a new logical block address (LBA) to a segment corresponding to an invalidated logical block address (LBA) through foreground garbage collection (foreground GC) while performing consecutive write operations on the memory device 100 and assigning logical block addresses (LBA) assigned to a plurality of zones to a single zone.

FIG. 5 is a diagram illustrating zones of an example of a file system and programmed memory blocks.

Referring to FIGS. 4 and 5, FIG. 5 illustrates a plurality of zones included in the file system of FIG. 4 (e.g., file system 310 of FIG. 4), and a plurality of memory blocks included in the memory device of FIG. 4 (e.g., memory device 100 of FIG. 4).

In FIG. 5, although it is illustrated that a plurality of zones are first to third zones ZONE1 to ZONE3 and a plurality of memory blocks are first to third memory blocks BLK1 to BLK3, more zones or fewer zones may be included in the file system (e.g., file system 310 of FIG. 4), and more memory blocks or fewer memory blocks may be included in the memory device (e.g., memory device 100 of FIG. 4). Each of the first to third zones ZONE1 to ZONE3 may include a plurality of segments.

Furthermore, each of the first to third zones ZONE1 to ZONE3 may be a unit on which garbage collection (GC) is performed, where each zone may correspond to a memory block. Each of the plurality of segments may be a unit on which a program operation and a read operation are performed, where each segment may correspond to a page included in a memory block.

In the example shown in FIG. 5, logical block addresses (LBA) output from the host (e.g., host 300 of FIG. 4) are logical block addresses (LBA) corresponding to consecutive program requests. Further, for each file, consecutive program operations are performed in the example. That is, after pieces of data included in a first file FILE1 have been consecutively programmed, pieces of data included in a second file FILE2 and pieces of data included in a third file FILE3 may be consecutively programmed.

In an embodiment, the file system (e.g., file system 310 of FIG. 4) may include first to third zones ZONE1 to ZONE3, each of which may include seven segments. A logical block address (LBA) may be assigned to each segment.

For example, first to seventh logical block addresses LBA1 to LBA7 corresponding to pieces of data included in the first file FILE1 may be assigned to the first zone ZONE1, eighth to fourteenth logical block addresses LBA8 to LBA14 corresponding to pieces of data included in the second file FILE2 may be assigned to the second zone ZONE2, and fifteenth to 21st logical block addresses LBA15 to LBA21 corresponding to pieces of data included in the third file FILE3 may be assigned to the third zone ZONE3.

When the logical block addresses (LBA) corresponding to pieces of data included in respective files are assigned to a plurality of segments, consecutive program operations, that is, consecutive write operations, may be performed on memory blocks included in the memory device (e.g., memory device 100 of FIG. 4).

More specifically, the flash translation layer (e.g., flash translation layer 210 of FIG. 4) may assign first to seventh logical block addresses LBA1 to LBA7 to consecutive physical block addresses. That is, the flash translation layer may sequentially map the first to seventh logical block addresses LBA1 to LBA7 to physical block addresses corresponding to pages included in the first memory block BLK1.

In the same manner, the flash translation layer may sequentially map the eighth to fourteenth logical block addresses LBA8 to LBA14 to physical block addresses corresponding to pages included in the second memory block BLK2, and may sequentially map the fifteenth to 21st logical block addresses LBA15 to LBA21 to physical block addresses corresponding to pages included in the third memory block BLK3.

Thereafter, when the memory device (e.g., memory device 100 of FIG. 4) receives physical block addresses from the flash translation layer, consecutive program operations may be performed.

For example, the pieces of data included in the first file FILE1 may be sequentially programmed to the pages included in the first memory block BLK1, the pieces of data included in the second file FILE2 may be sequentially programmed to the pages included in the second memory block BLK2, and the pieces of data included in the third file FILE3 may be sequentially programmed to the pages included in the third memory block BLK3.

In an embodiment, since the logical block addresses (LBA) have been assigned to all of segments in respective zones of the file system (e.g., file system 310 of FIG. 4), assigning a subsequent logical block address (LBA) may be problematic. For example, in order to assign the subsequent logical block address (LBA), the file system (e.g., file system 310 of FIG. 4) may perform garbage collection (GC).

Figure 6:
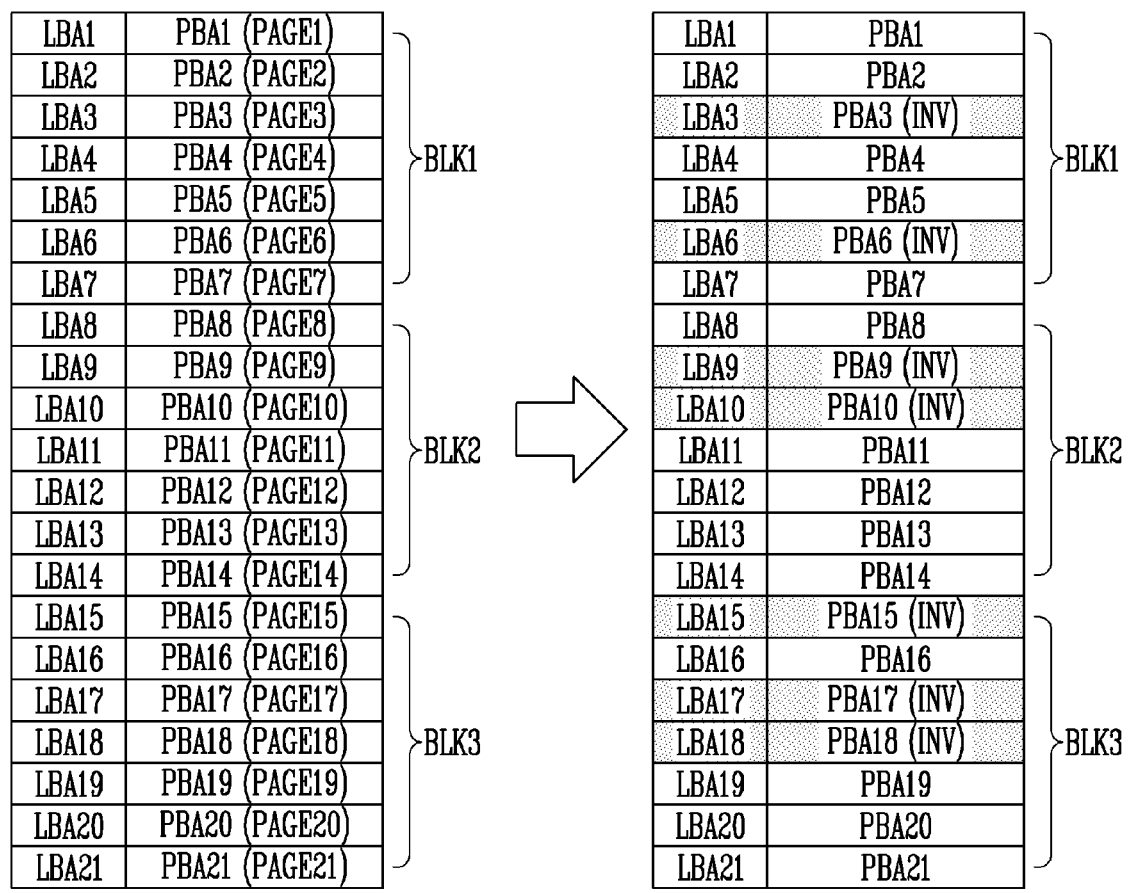
FIG. 6 is a diagram illustrating examples of invalidated pages when map update occurs.

FIG. 6 is a diagram illustrating examples of invalidated pages when map update occurs.

Referring to FIGS. 5 and 6, physical block addresses corresponding to first to 21st pages PAGE1 to PAGE21 included in the first to third blocks BLK1 to BLK3 of FIG. 5, and logical block addresses corresponding to the respective physical block addresses are illustrated in FIG. 6.

In the example shown in FIG. 6, the first memory block BLK1 includes first to seventh pages PAGE1 to PAGE7, the second memory block BLK2 includes eighth to fourteenth pages PAGE8 to PAGE14, and the third memory block BLK3 includes fifteenth to 21st pages PAGE15 to PAGE21.

In an embodiment, the first to 21st logical block addresses LBA1 to LBA21 may be mapped to the first to 21-st physical block addresses PBA1 to PBA21. That is, the first to 21-st physical block addresses PBA1 to PBA21 may be addresses corresponding to the first to 21-th pages PAGE1 to PAGE21 respectively.

Referring to FIGS. 5 and 6, by using the file system (e.g., file system 310 of FIG. 4), when the logical block addresses LBA1 to LBA7 corresponding to pieces of data included in the first file FILE1, the logical block addresses LBA8 to LBA14 corresponding to pieces of data included in the second file FILE2, and the logical block addresses LBA15 to LBA21 corresponding to pieces of data included in the third file FILE3 are consecutively assigned, consecutive program operations may be performed on pages corresponding to the first to seventh physical block addresses PBA1 to PBA7, the eighth to fourteenth physical block addresses PBA8 to PBA14, and the fifteenth to 21-st physical block addresses PBA15 to PBA21.

Thereafter, the map data may be updated through wear-leveling or garbage collection (GC), and one or more pages in a memory block may be invalidated.

For example, by means of wear-leveling or garbage collection (GC), data of the third page PAGE3 corresponding to the third physical block address PBA3, data of the sixth page PAGE6 corresponding to the sixth physical block address PBA6, data of the ninth page PAGES corresponding to the ninth physical block address PBA9, data of the tenth page PAGE10 corresponding to the tenth physical block address PBA10, data of the fifteenth page PAGE15 corresponding to the fifteenth physical block address PBA15, data of the seventh page PAGE17 corresponding to the seventh physical block address PBA17, and data of the eighteenth page PAGE18 corresponding to the eighteenth physical block address PBA18 may be invalidated.

Therefore, a mapping relationship between the third logical block address LBA3 and the third physical block address PBA3, a mapping relationship between the sixth logical block address LBA6 and the sixth physical block address PBA6, a mapping relationship between the ninth logical block address LBA9 and the ninth physical block address PBA9, a mapping relationship between the tenth logical block address LBA10 and the tenth physical block address PBA10, a mapping relationship between the fifteenth logical block address LBA15 and the fifteenth physical block address PBA15, a mapping relationship between the seventeenth logical block address LBA17 and the seventeenth physical block address PBA17, and a mapping relationship between the eighteenth logical block address PBA18 and the eighteenth physical block address PBA18 may be invalidated.

In an embodiment, when the mapping relationships between the logical block addresses (LBA) and the physical block addresses (PBA) are invalidated, the segments included in respective zones of the file system (e.g., file system 310 of FIG. 4) may also be invalidated.

In an embodiment, assigning logical block addresses (LBA) to segments of respective zones before the file system performs the garbage collection (GC) and after respective segments have been invalidated may be problematic.

Figure 7:
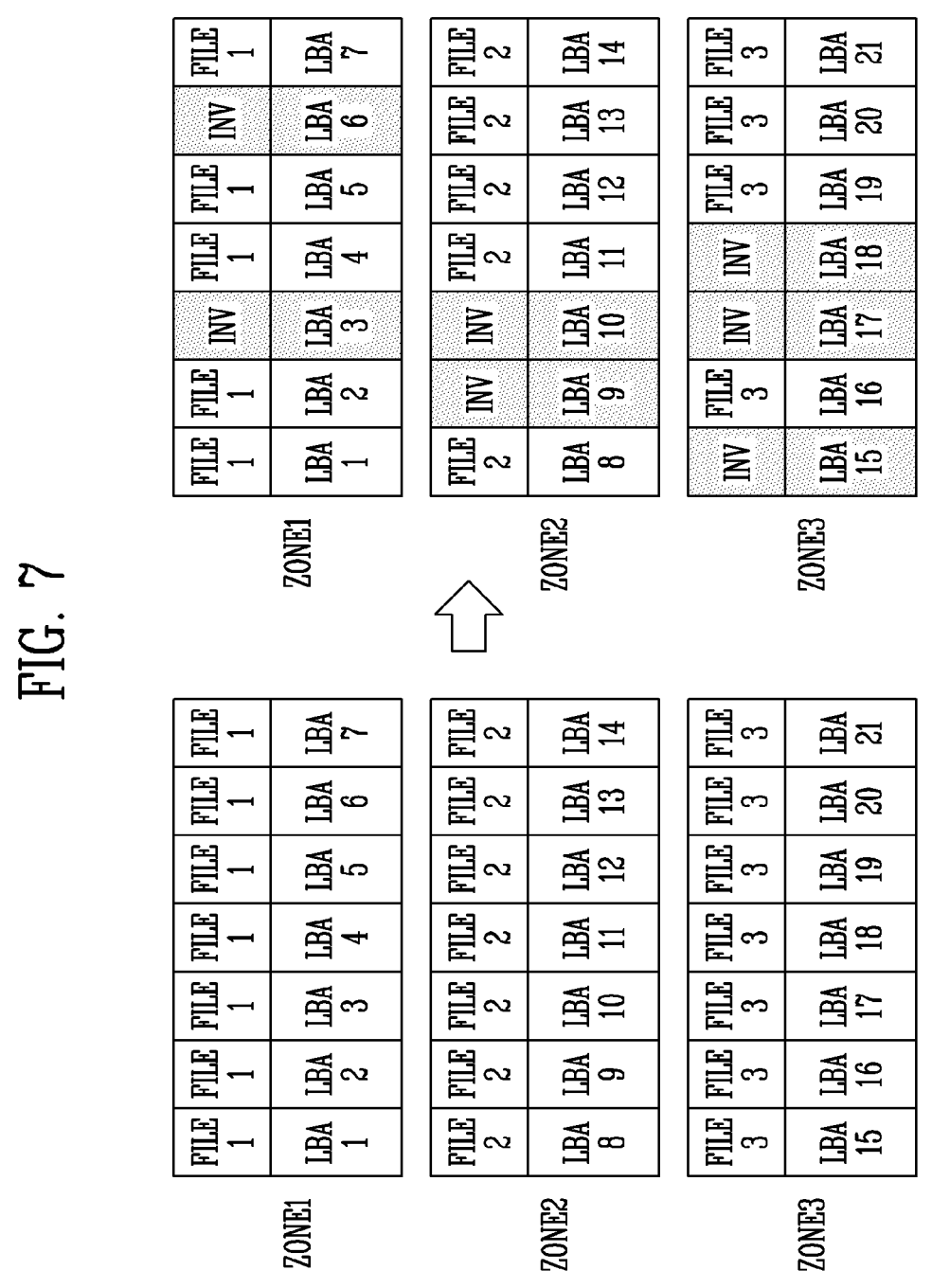

FIG. 7 is a diagram illustrating an example of updating respective zones of a file system based on map update.

Referring to FIGS. 6 and 7, FIG. 7 illustrates an example of a process in which, after data of the third page PAGE3, data of the sixth page PAGE6, data of the ninth page PAGES, data of the tenth page PAGE10, data of the fifteenth page PAGE15, data of the seventh page PAGE17, and data of the eighteenth page PAGE18 of the memory device shown in FIG. 6 have been invalidated, corresponding segments of respective zones included in the file system (e.g., file system 310 of FIG. 4) are invalidated.

In an embodiment, as map data is updated through wear-leveling or garbage collection (GC), respective zones of the file system may be updated.

For example, as data of the third, sixth, ninth, tenth, fifteenth, seventh, and eighteenth pages (PAGE3, PAGE6, PAGES, PAGE10, PAGE15, PAGE17, and PAGE18) of the memory device shown in FIG. 6 is invalidated, the mapping relationships between logical block addresses (LBA) and physical block addresses (PBA) corresponding to these pages may be invalidated.

In an exemplary embodiment, as the mapping relationships between the logical block addresses (LBA) and the physical block addresses (PBA) are invalidated, the third and sixth logical block addresses LBA3 and LBA6 assigned to the first zone ZONE1, the ninth and tenth logical block addresses LBA9 and LBA10 assigned to the second zone ZONE2, and the fifteenth, seventeenth, and eighteenth logical block addresses LBA15, LBA17, and LBA18 assigned to the third zone ZONE3 of the file system may be invalidated.

Here, since the logical block addresses LBA1 to LBA21 have been assigned to all segments in respective zones included in the file system (e.g., file system 310 of FIG. 4), there may be no segments to which new logical block addresses can be subsequently assigned. Therefore, during idle time, garbage collection (GC) may be performed by the file system.

However, since idle time is not always present, garbage collection (GC) may not be performed by the file system when needed. In this case, since logical block addresses may not be assigned to unassigned zones of the file system, new logical block addresses may be re-assigned to segments of respective zones of the file system using slack space recycling (SSR).

Figure 8:
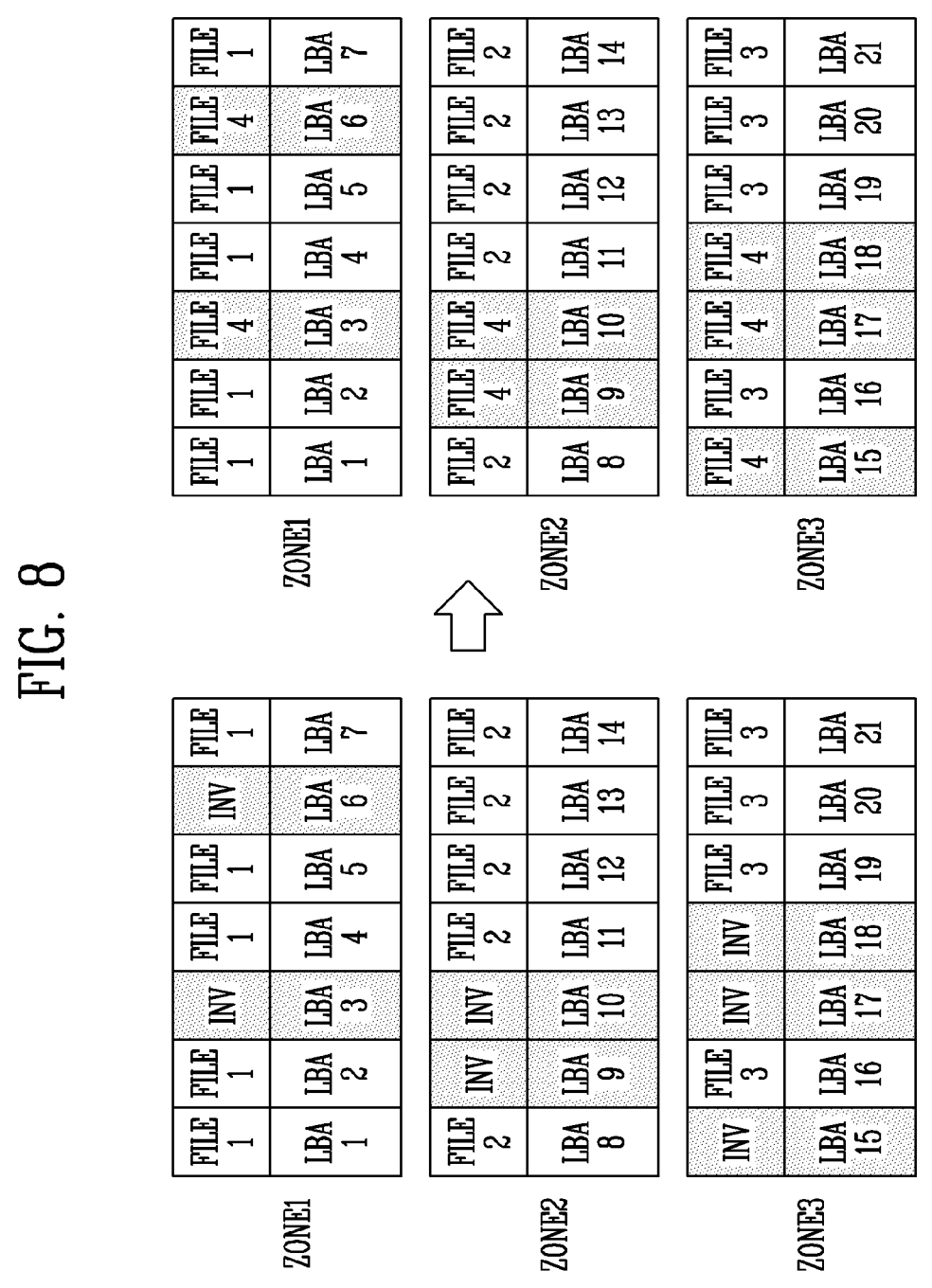

FIG. 8 is a diagram illustrating an example in which logical block addresses are assigned to invalidated segments Referring to FIGS. 7 and 8, after segments corresponding to third and sixth logical block addresses LBA3 and LBA6 assigned to the first zone ZONE1, ninth and tenth logical block addresses LBA9 and LBA10 assigned to the second zone ZONE2, and fifteenth, seventeenth, and eighteenth logical block addresses LBA15, LBA17, and LBA18 assigned to the third zone ZONE3 in FIG. 7 have been invalidated, assignment of new logical block addresses is illustrated in FIG. 8.

In an embodiment, because an idle time may not occur after logical block addresses LBA1 to LBA21 have been assigned to all of the segments in respective zones included in the file system (e.g., file system 310 of FIG. 4), garbage collection may not be performed on the file system. In this case, in a busy state, the file system may assign new logical block addresses to respective zones using slack space recycling (SSR) instead of garbage collection (GC).

In an embodiment, after logical block addresses corresponding to pieces of data included in the third file FILE3 have been assigned to the third zone ZONE3, logical block addresses corresponding to pieces of data included in the fourth file FILE4 may be assigned to the file system (e.g., file system 310 of FIG. 4).

In some cases, the file system may be in a busy state, and thus garbage collection (GC) may not be performed. In such cases, an overwrite operation to a specific segment may be performed through slack space recycling (SSR).

For example, because segments corresponding to the third and sixth logical block addresses LBA3 and LBA6 assigned to the first zone ZONE1, segments corresponding to the ninth and tenth logical block addresses LBA9 and LBA10 assigned to the second zone ZONE2, and segments corresponding to the fifteenth, seventeenth, and eighteenth logical block addresses LBA15, LBA17, and LBA18 assigned to the third zone ZONE3 have been invalidated, logical block addresses corresponding to pieces of data included in the fourth file FILE4 may be assigned to these invalidated segments in ZONE1, ZONE2, and ZONE3.

However, since the logical block addresses corresponding to pieces of data included in the fourth file FILE4 are not consecutively assigned in a single zone, a random write operation rather than consecutive write operations may be performed. Because of the random write operation, the performance of the storage device may be deteriorated. That is, the mapping relationship between pieces of consecutive data and consecutive logical block addresses may not be formed by the file system (e.g., file system 310 of FIG. 4), and thus performance of the storage device may be deteriorated.

Furthermore, since the mapping relationships between consecutive logical block addresses and pieces of inconsecutive data are formed, additional performance loss may be caused in the formation of mapping relationships.

According to certain embodiments, a data program method and a mapping data update method when logical block addresses are assigned to respective zones through slack space recycling (SSR) are provided.

FIG. 9 is a diagram illustrating an example of programming data after new logical block addresses are assigned to invalid segments.

Referring to FIGS. 6, 8, and 9, a process is illustrated in which, after the mapping relationships between logical block addresses (LBA) and physical block addresses (PBA) have been invalidated in FIG. 6, logical block addresses corresponding to pieces of data included in the fourth file FILE4 are assigned to respective invalidated segments in FIG. 8, after which the pieces of data included in the fourth file FILE4 are programmed to the memory blocks included in the memory device (e.g., memory device 100 of FIG. 4).

In the example shown in FIG. 9, the memory device includes an additional memory block, for example, a fourth memory block BLK4, in addition to first to third memory blocks BLK1 to BLK3. The additional memory block may be a memory block of an over-provisioning (OP) area that is additionally included, besides the memory blocks in a user area.

In an embodiment, since no unassigned segments are present in the file system (e.g., file system 310 of FIG. 4), logical block addresses corresponding to pieces of data included in the fourth file FILE4 may be assigned using slack space recycling (SSR) even before garbage collection (GC) is performed to secure free segments. More specifically, since new logical block addresses are assigned to invalidated segments, logical block addresses corresponding to pieces of data included in the fourth file FILE4 may be assigned to the invalidated segments.

When the file system assigns logical block addresses corresponding to respective pieces of data included in the fourth file FILE4, the flash translation layer (e.g., flash translation layer 210 of FIG. 4) may translate logical block addresses corresponding to the pieces of data included in the fourth file FILE4 into physical block addresses. Here, the translated physical block addresses may be addresses corresponding to pages included in the fourth memory block BLK4.

Thereafter, when the flash translation layer outputs physical block addresses corresponding to pages included in the fourth memory block BLK4 to the memory device, the memory device may consecutively program pieces of data included in the fourth file FILE4 to the pages corresponding to the physical block addresses. Thus, consecutive write operations may be performed.

As a result, since the file system (e.g., file system 310 of FIG. 4) enables this type of overwriting, logical block addresses corresponding to pieces of data included in the fourth file FILE4 may be assigned to invalidated segments. Therefore, even if the memory device (e.g., memory device 100 of FIG. 4) is incapable of performing overwriting, consecutive write operations may be performed on the pages included in the fourth memory block BLK4.

However, since logical block addresses are not consecutively assigned to the segments of the file system (e.g., file system 310 of FIG. 4) in the example shown in FIG. 9, operations of consecutively assigning logical block addresses may be performed.

FIG. 10 is a diagram illustrating an example of a process in which garbage collection is performed in a file system.

Referring to FIGS. 8 and 10, a process in which, after logical block addresses corresponding to pieces of data included in a fourth file FILE4 have been assigned to respective segments as shown in FIG. 8, consecutive logical block addresses are assigned to respective segments using garbage collection (GC) is illustrated in FIG. 10.

In an embodiment, when logical block addresses LBA1 to LBA21 have been assigned to all of the segments of respective zones included in the file system (e.g., file system 310 of FIG. 4), garbage collection (GC) may be performed on the file system during an idle time so as to secure spare segments. Here, garbage collection (GC) may also be triggered even by an internal operation of the host (e.g., host 300 of FIG. 4).

In an embodiment, as garbage collection (GC) is performed, the first to third zones ZONE1 to ZONE3 may be reset to X-th to Z-th zones ZONE_X to ZONE_Z.

When the first to third zones ZONE1 to ZONE3 are set to the X-th to Z-th zones ZONE_X to ZONE_Z, consecutive logical block addresses may be assigned to the X-th to Z-th zones ZONE_X to ZONE_Z. That is, the logical block addresses corresponding to the pieces of data included in the first to fourth files FILE1 to FILE4 may be sequentially assigned again to the X-th to Z-th zones ZONE_X to ZONE_Z. Here, the invalidated segments in the first to third zones ZONE1 to ZONE3 may not be assigned in the X-th to Z-th zones ZONE_X to ZONE_Z.

For example, the logical block addresses corresponding to pieces of data included in the first file FILE1 may be sequentially assigned, as X1-th to X5-th logical block address LBAX1 to LBAX5, to respective segments in the X-th zone ZONE_X.

The logical block addresses corresponding to pieces of data included in the second file FILE2 may be sequentially assigned, as X6-th and X7-th logical block addresses LBAX6 and LBAX7, to respective segments in the X-th zone ZONE_X, and may be sequentially assigned, as Y1-th to Y3-th logical block addresses LBAY1 to LBAY3, to respective segments in the Y-th zone ZONE_Y.

The logical block addresses corresponding to pieces of data included in the third file FILE3 may be sequentially assigned, as Y4-th to Y7-th logical block address LBAY4 to LBAY7, to respective segments in the Y-th zone ZONE_Y.

The logical block addresses corresponding to pieces of data included in the fourth file FILE4 may be sequentially assigned, as Z1-th to Z7-th logical block address LBAZ1 to LBAZ7, to respective segments in the Z-th zone ZONE_Z.

As described above, as garbage collection (GC) is performed on the file system (e.g., file system 310 of FIG. 4), logical block addresses corresponding to consecutive pieces of data included in the first to fourth files FILE1 to FILE4 may be sequentially assigned to segments of the X-th to Z-th zones ZONE_X to ZONE_Z. Therefore, the logical block addresses corresponding to pieces of data included in the fourth file system FILE4 may be assigned to the segments of the Z-th zone ZONE_Z, which is a single zone.

In an embodiment, as garbage collection (GC) is performed on the file system (e.g., file system 310 of FIG. 4), the flash translation layer (e.g., flash translation layer 210 of FIG. 4) may update the mapping relationship between the logical block address (LBA) and the physical block address PBA. Also, since the flash translation layer updates the mapping relationships, pieces of data in the pages included in the memory block of the memory device (e.g., memory device 100 of FIG. 4) may also be moved.

Figure 11:
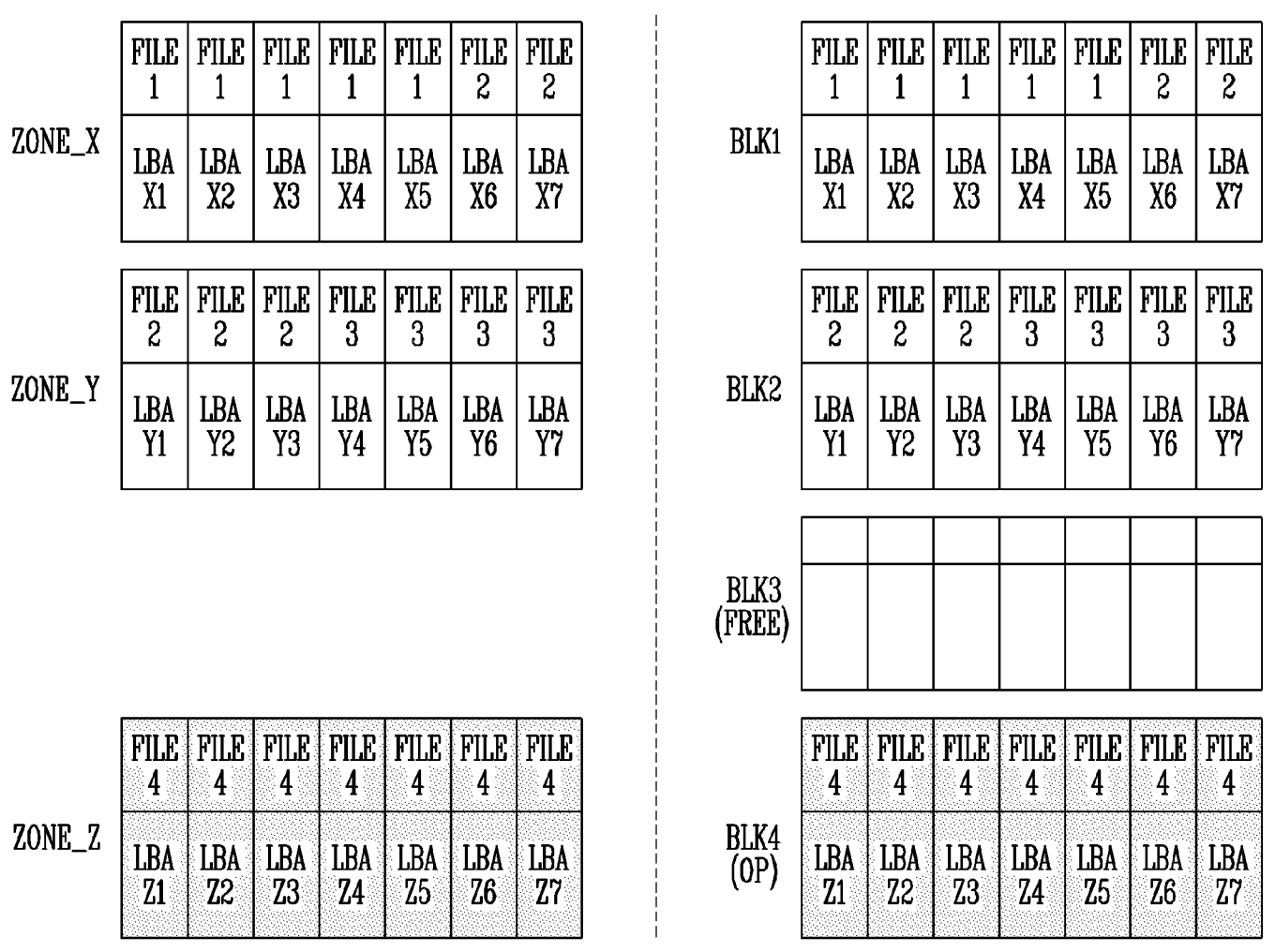

FIG. 11 is a diagram illustrating mapping relationships that are changed after garbage collection has been performed on a file system.

Referring to FIGS. 10 and 11, mapping relationships that are changed after garbage collection (GC) has been performed on the file system (e.g., file system 310 of FIG. 4) in FIG. 10 are illustrated in FIG. 11.

In an embodiment, when update information depending on the performance of garbage collection (GC) is received from the file system, the flash translation layer (e.g., flash translation layer 210 of FIG. 4) may update the mapping relationships between the logical block address (LBA) and the physical block address (PBA).

In an embodiment, as the flash translation layer updates the mapping relationships, the X1-th to X5-th logical block addresses LBAX1 to LBAX5 corresponding to pieces of data included in the first FILE1 may form mapping relationships with the first to fifth physical block addresses PBA1 to PBA5 respectively corresponding to pages included in the first memory block BLK1.

The X6-th and X7-th logical block addresses LBAX6 and LBAX7 and Y1-th to Y3-th logical block addresses LBAY1 to LBAY3, which correspond to pieces of data included in the second file FILE2, may form mapping relationships with the sixth and seventh physical block addresses PBA6 and PBA7, which correspond to pages included in the first memory block BLK1, and eighth to tenth physical block addresses PBA8 to PBA10, which correspond to pages included in the second memory block BLK2.

The Y4-th to Y7-th logical block addresses LBAY4 to LBAY7 corresponding to pieces of data included in the file FILE3 may form mapping relationships with eleventh to fourteenth physical block addresses PBA11 to PBA14 corresponding to pages included in the second memory block BLK2.

As a result, the pieces of data included in the first to third files FILE1 to FILE3 are sequentially programmed to pages in the first and second memory blocks BLK1 and BLK2, and thus the pieces of data in the pages in the first and second memory blocks BLK1 and BLK2 may be treated as consecutive data.

Also, as pieces of data in the pages included in the first to third memory blocks BLK1 to BLk3 are moved, the third memory block BLK3 may become a free block. Thereafter, new data may be programmed to pages included in the third memory block BLK3.

In an embodiment, as the flash translation layer (e.g., flash translation layer 210 of FIG. 4) updates the mapping relationships, the Z1-th to Z7-th logical block addresses LBAZ1 to LBAZ7 corresponding to pieces of data included in the fourth file FILE4 may form respective mapping relationships with physical block addresses corresponding to pages included in the fourth memory block BLK4.

As the Z1-th to Z7-th logical block addresses LBAZ1 to LBAZ7 form mapping relationships with the physical block addresses corresponding to the pages included in the fourth memory block BLK4, only mapping relationships may be updated without moving data of the pages included in the fourth memory block BLK4. That is, because only the mapping relationships are updated without moving data in the pages in the fourth memory block BLK4, pieces of data of the pages in the fourth memory block BLK4 may be treated as consecutive pieces of data.

Therefore, pieces of data programmed to the pages in the memory block without movement of the data may be treated as consecutive pieces of data.

Figure 12:
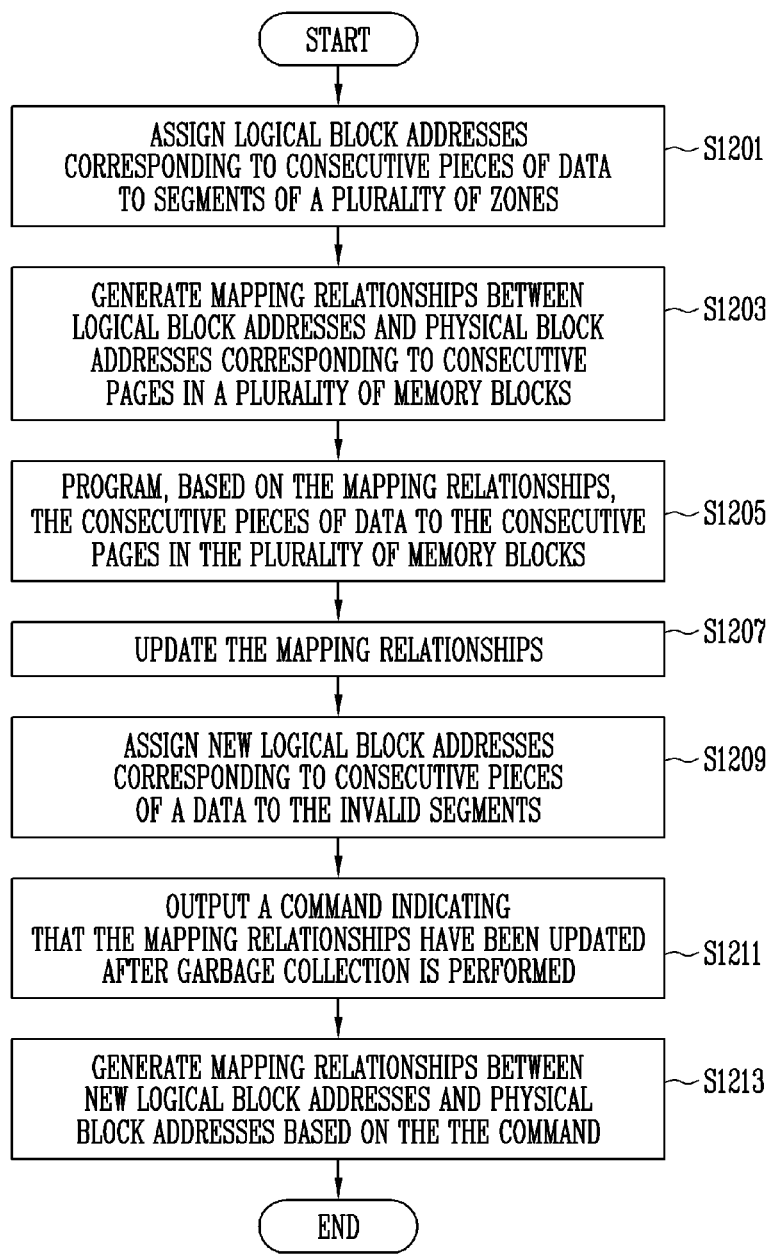
FIG. 12 is a flowchart illustrating an example of the operation of an electronic system according to an embodiment.

FIG. 12 is a flowchart illustrating an example of the operation of an electronic system according to an embodiment.

Referring to FIG. 12, at S1201, a host or a file system (e.g., file system 310 of FIG. 4) of the host may assign logical block addresses corresponding to consecutive pieces of data to a plurality of zones of the file system. In an embodiment, the host may sequentially assign logical block addresses corresponding to the consecutive pieces of data so as to rapidly access the consecutive pieces of data.

For example, a file system included in a host of the electronic system may include a plurality of zones, and each zone may include a set of segments. The host or the file system may sequentially assign logical block addresses corresponding to consecutive pieces of data (e.g., data files) to the sets of segments of the plurality of zones. One example of assigning logical block addresses corresponding to consecutive pieces of data to the sets of segments of the plurality of zones is shown in FIG. 5.

At S1203, the memory controller may generate mapping relationships between logical block addresses and physical block addresses corresponding to consecutive pages in a plurality of memory blocks, for example, based on logical block addresses output from the host. Here, the logical block addresses output from the host may be logical block addresses corresponding to consecutive pieces of data. After the mapping relationships have been formed, the memory controller may output the physical addresses to the memory device. An example of generating mapping relationships between the logical block addresses and physical block addresses is shown in FIG. 5.

At S1205, the memory controller may, based on the mapping relationships, control the memory device to program the consecutive pieces of data to consecutive pages in the plurality of memory blocks that correspond to physical block addresses output from the memory controller. An example of programming the consecutive pieces of data to the consecutive pages in the plurality of memory blocks is shown in FIGS. 5 and 6.

Thereafter, at S1207, the memory controller may update the mapping relationships, where the updated mapping relationships indicate one or more physical block addresses associated with invalid or outdated data. For example, when the map data is updated through wear-leveling or garbage collection (GC), the memory controller may update the mapping relationships between the logical block addresses and the physical block addresses based on the update information output from the memory device. An example of updating the mapping relationships is shown in FIG. 6.

When the mapping relationships are updated, the host may invalidate segments in a specific zone, among the plurality of zones included in the file system. That is, as the map data is updated, segments to which the corresponding logical block addresses are assigned may be invalidated based on the newly formed mapping relationships. One or more segments in the plurality of zones may be changed to the invalid segments. An example of invalidating segments in the plurality of zones of the file system based on updated mapping relationships is shown in FIGS. 6 and 7.

At S1209, the host may assign new logical block addresses corresponding to consecutive pieces of a data file to the invalid segments, where each of the invalid segments may have been assigned a logical block address mapped to a physical block address of the one or more physical block addresses associated with invalid or outdated data. In an embodiment, garbage collection (GC) may not be performed on the file system for a long period of time. In some cases, no unassigned segments may be available, and thus new logical block addresses may not be assigned to unassigned segments. In such cases, new logical block addresses may overwrite the logical block addresses that have been assigned to the invalidated segments, through slack space recycling (SSR). An example of assigning new logical block addresses corresponding to consecutive pieces of a data file to the invalid segments is shown in FIG. 8.

Assigning the new logical block addresses corresponding to the consecutive pieces of the data file to the invalid segments may cause the memory controller to map the new logical block addresses assigned to the invalid segments to physical block addresses that correspond to consecutive pages in a memory block of the plurality of memory blocks. The memory controller may use the mapping to program the data file to consecutive pages in a memory block of the memory device, such as pages in a memory block in an over-provisioning area, as shown in, for example, FIG. 9.

Optionally, at S1211, the host may perform garbage collection (GC), and may output a command, indicating that the mapping relationship has been updated through the garbage collection (GC), to the memory controller.

For example, the host or the file system may autonomously perform garbage collection (GC), and zones in the host may be reset to new zones except for the invalidated segments through garbage collection (GC) as shown in, for example, FIG. 10. When performing the garbage collection, the host or the file system may assign the new logical block addresses that are assigned to the invalid segments to the set of segments in a zone of the plurality of zones. Thereafter, the host may output a command, indicating that the mapping relationships have been updated through garbage collection (GC), to the memory controller.

Optionally, at a S1213, the memory controller may form new mapping relationships between logical block addresses and physical block addresses based on the command that has been received from the host and that indicates that the mapping relationships have been updated. In one example, the physical block addresses may be addresses corresponding to pages included in the memory block of an over-provisioning (OP) area additionally included, in addition to the memory blocks in the user area.

Therefore, new logical block addresses corresponding to consecutive pieces of the data file may be mapped to physical block addresses corresponding to pages in the new memory block, and thus the consecutive pieces of the data file may be programmed to the pages in the new memory block (e.g., BLK4 in FIG. 11). In some embodiments, the memory controller may, based on the updated mapping information, control the memory device to move the consecutive pieces of data to consecutive pages in the plurality of memory blocks as shown in, for example, FIG. 11, where one or more memory blocks may be free blocks.

Figure 13:
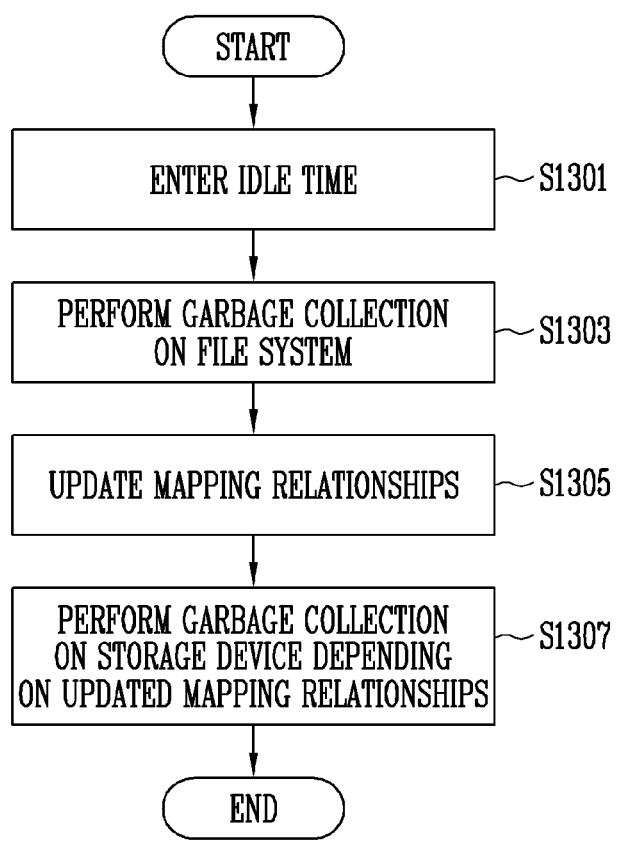
FIG. 13 is a flowchart illustrating an example of the operation of an electronic system according to an embodiment.

FIG. 13 is a flowchart illustrating an example of the operation of an electronic system according to an embodiment.

Referring to FIG. 13, at S1301, a host of the electronic system may enter an idle time. The idle time may be a period during which no operation is performed.

At S1303, garbage collection (GC) may be performed on a file system included in the host. For example, garbage collection (GC) may be performed on the file system so that spare segments are secured in the file system. When garbage collection (GC) is performed on the file system, logical block addresses assigned to the invalidated segments through slack space recycling (SSR) may be re-assigned to segments in one zone of a plurality of zone.

At S1305, the memory controller may update the mapping relationships. For example, as garbage collection (GC) is performed on the file system, zones in the file system may be reset, and logical block addresses corresponding to consecutive pieces of data may be sequentially re-assigned to the segments in the reset zones. The memory controller may then update the mapping relationships between logical block addresses and physical block addresses, based on the logical block addresses sequentially re-assigned to the segments in the reset zones.

At S1307, garbage collection may be performed on the storage device based on the updated mapping relationships. For example, because the logical block addresses are reassigned to respective zones of the file system, the memory controller may update the mapping relationships between logical block addresses and the physical block addresses. Furthermore, the memory device may be controlled by the memory controller to move the data based on the updated mapping relationships.

In an embodiment, the logical block addresses assigned to the invalidated segments may be re-assigned to segments in one zone, only mapping relationships may be updated without movement of data in the memory device, and thus pieces of data corresponding to logical block addresses assigned to one zone may be treated as consecutive pieces of data.

Figure 14:
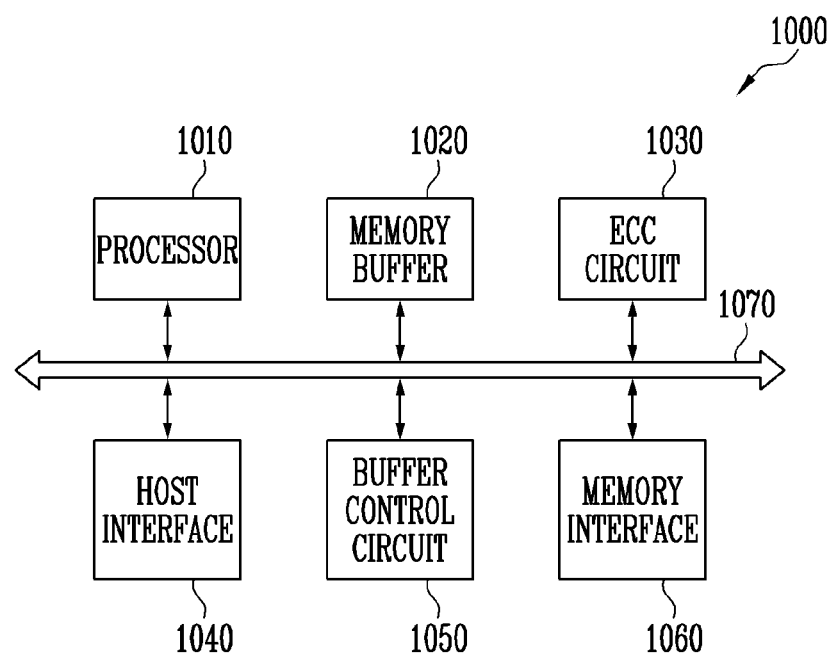
FIG. 14 is a block diagram illustrating an example of a memory controller of the storage device of FIG. 1.

FIG. 14 is a block diagram illustrating an example of a memory controller of the storage device of FIG. 1.

In the illustrated example, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 14, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may run software or firmware to perform the randomizing or derandomizing operation.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. The ECC circuit 1030 may perform error correction code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

Figure 15:
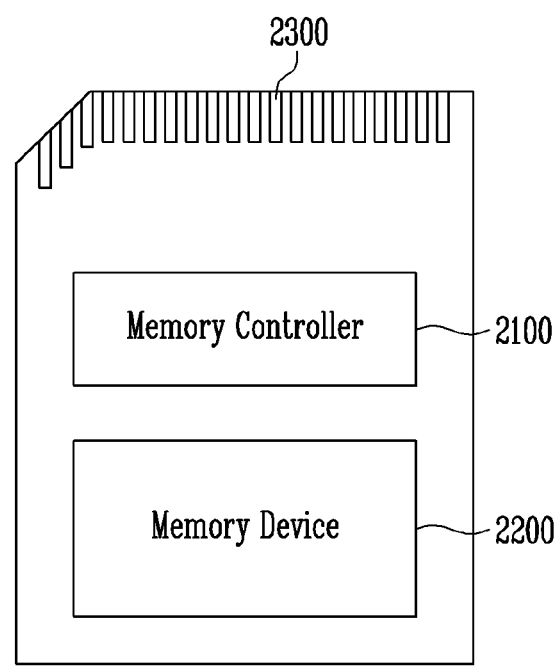
FIG. 15 illustrates an example of a memory card system in which a storage device according to an embodiment may be used.

FIG. 15 illustrates an example of a memory card system in which the storage device according to an embodiment may be used.

Referring to FIG. 15, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device (e.g., memory device 100 of FIG. 1) described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin Transfer Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 16:
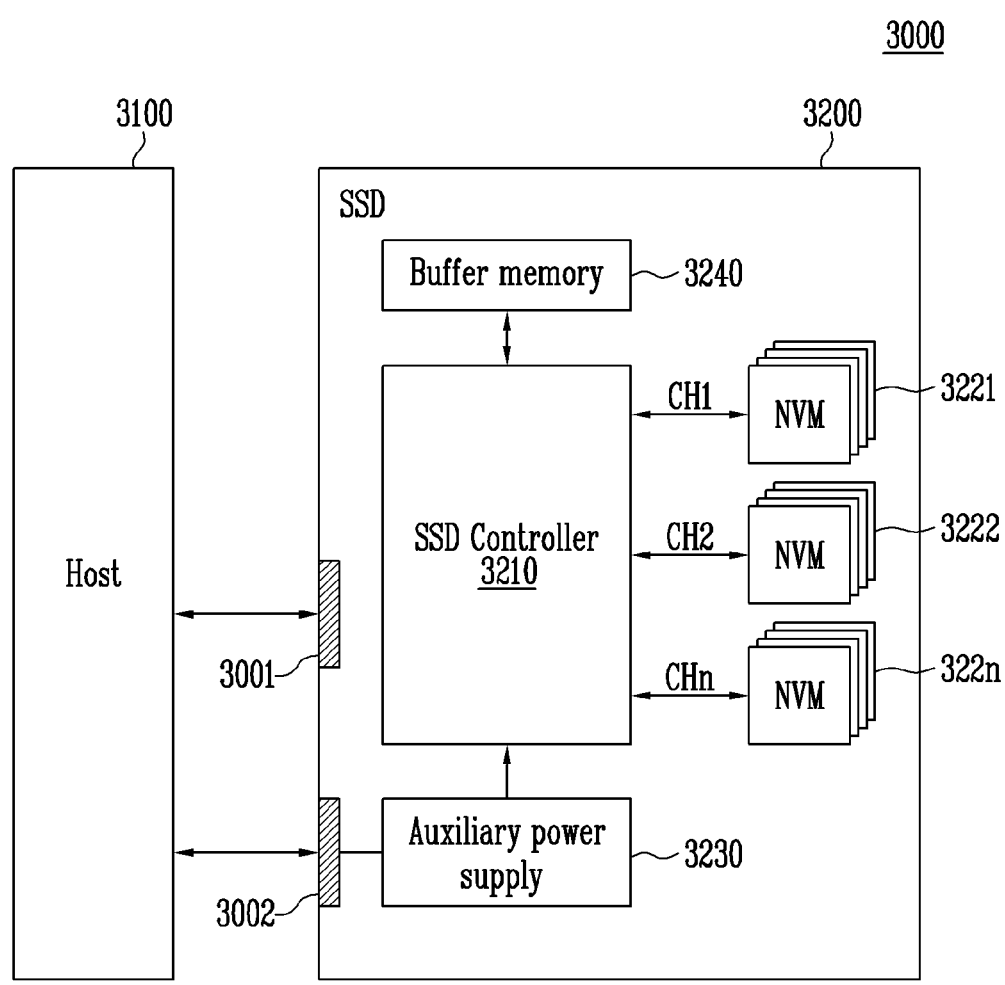
FIG. 16 is a block diagram of an example of a solid state drive (SSD) system in which a storage device according to an embodiment may be used.

FIG. 16 is a block diagram of an example of a solid state drive (SSD) system in which a storage device according to an embodiment may be used.

Referring to FIG. 16, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of nonvolatile memories 3221 to 322n, an auxiliary power supply 3230, and a buffer memory 3240.

In an embodiment, the SSD controller 3210 may perform the function of the memory controller (e.g., memory controller 200 of FIG. 1) described above with reference to FIG. 1.

The SSD controller 3210 may control the plurality of nonvolatile memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of nonvolatile memories 3221 to 322n or may temporarily store metadata (e.g., mapping tables) of the nonvolatile memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 17:
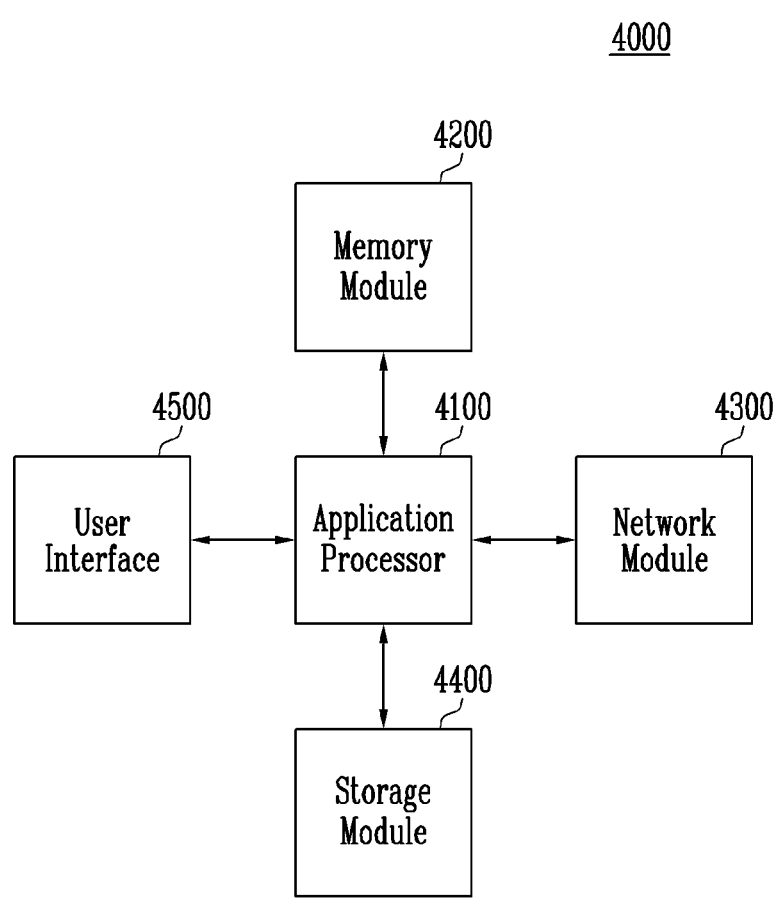
FIG. 17 is a block diagram illustrating an example of a user system in which a storage device according to an embodiment may be used.

FIG. 17 is a block diagram illustrating an example of a user system in which the storage device according to an embodiment may be used.

Referring to FIG. 17, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIGS. 2 and 3. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, when a free segment is not present in a flash friendly file system (F2FS)-type file system, an overwrite operation is performed on an invalid segment, and logical block addresses are translated into addresses corresponding to consecutive data by moving logical block addresses to one area through garbage collection during an idle time, thus improving the performance of an electronic system including a host, a memory controller, and a memory device.

What is claimed is:

1. An electronic system, comprising:
    a file system configured to assign logical block addresses corresponding to consecutive pieces of data to sets of segments in a plurality of zones;
    a memory device including a plurality of memory blocks; and
    a memory controller configured to map the logical block addresses to physical block addresses corresponding to consecutive pages in the plurality of memory blocks to program the consecutive pieces of data to the consecutive pages in the plurality of memory blocks,
    wherein the file system is configured to assign new logical block addresses corresponding to consecutive pieces of a data file to invalid segments in the plurality of zones, and wherein each of the invalid segments has been assigned a logical block address mapped to a physical block address associated with invalid data.

2. The electronic system according to claim 1, wherein:
    the memory controller is configured to update mapping relationships between the logical block addresses and the physical block addresses, the updated mapping relationships indicating one or more physical block addresses associated with the invalid data; and
    the file system is configured to, based on the updated mapping relationships, change one or more segments in the plurality of zones to the invalid segments.

3. The electronic system according to claim 1, wherein the file system is configured to assign the new logical block addresses to the invalid segments among the sets of segments that have been assigned the logical block addresses.

4. The electronic system according to claim 1, wherein the memory controller is configured to map the new logical block addresses assigned to the invalid segments to physical block addresses that correspond to consecutive pages in a memory block of the plurality of memory blocks.

5. The electronic system according to claim 4, wherein the memory block of the plurality of memory blocks is in an over-provisioning area.

6. The electronic system according to claim 1, wherein the file system is configured to, after the sets of segments in the plurality of zones have been assigned, assign the new logical block addresses to the invalid segments, before performing garbage collection on the sets of segments in the plurality of zones.

7. The electronic system according to claim 6, wherein the file system is configured to, when performing the garbage collection, assign the new logical block addresses that are assigned to the invalid segments to a set of segments in a zone of the plurality of zones.

8. The electronic system according to claim 7, wherein the file system is configured to output mapping information updated based on the garbage collection to the memory controller.

9. The electronic system according to claim 8, wherein the memory controller is configured to, based on the updated mapping information, control the memory device to move the consecutive pieces of data.

10. The electronic system according to claim 7, wherein the memory controller is configured to, when performing the garbage collection, map logical block addresses that are assigned to the set of segments in the zone of the plurality of zones to physical block addresses that correspond to consecutively programmed pages in the memory device.

11. A method comprising, by an electronic system that includes a file system, and a memory device including a plurality of memory blocks:
    assigning logical block addresses corresponding to consecutive pieces of data to sets of segments in a plurality of zones;
    generating mapping relationships between the logical block addresses and physical block addresses corresponding to consecutive pages in the plurality of memory blocks;
    programming, based on the mapping relationships, the consecutive pieces of data to the consecutive pages in the plurality of memory blocks;
    updating the mapping relationships, the updated mapping relationships indicating one or more physical block addresses associated with invalid data; and
    assigning new logical block addresses corresponding to consecutive pieces of a data file to invalid segments, wherein each of the invalid segments has been assigned a logical block address mapped to a physical block address of the one or more physical block addresses associated with the invalid data.

12. The method according to claim 11, further comprising changing, based on the updated mapping relationships, one or more segments in the plurality of zones to the invalid segments.

13. The method according to claim 11, wherein assigning the new logical block addresses to the invalid segments comprises assigning the new logical block addresses to the invalid segments among the sets of segments that have been assigned the logical block addresses.

14. The method according to claim 11, further comprising mapping the new logical block addresses assigned to the invalid segments to physical block addresses that correspond to consecutive pages in a memory block of the plurality of memory blocks.

15. The method according to claim 14, wherein the memory block of the plurality of memory blocks is in an over-provisioning area.

16. The method according to claim 11, wherein assigning the new logical block addresses to the invalid segments comprises, after the sets of segments in the plurality of zones have been assigned, assigning the new logical block addresses to the invalid segments, before performing garbage collection on the sets of segments in the plurality of zones.

17. The method according to claim 16, further comprising assigning, when performing the garbage collection, the new logical block addresses that are assigned to the invalid segments to a set of segments in a zone of the plurality of zones.

18. The method according to claim 17, further comprising outputting mapping information updated based on the garbage collection to a memory controller of the electronic system.

19. The method according to claim 18, further comprising moving, based on the updated mapping information, the consecutive pieces of data in the plurality of memory blocks.

20. The method according to claim 17, further comprising mapping, when performing the garbage collection, logical block addresses that are assigned to the set of segments in the zone of the plurality of zones to physical block addresses that correspond to consecutively programmed pages in the memory device.

* * * * *